OPTOELECTRONIC SAMPLING HEAD

The invention herein described was made under a contract with the Department of the Navy.

This invention relates to optical detection devices and specifically to optical sampling heads usable in conjunction with photoelectron amplifying devices suitable for low power radiation detection.

A need exists for a high resolution sampling detector for detecting radiation levels, particularly optical, at relatively high sampling speeds. Since in many applications the photon flux level at high sampling speed will be low, a sensitive device for detection is required.

A conventional form of detection device is the photomultiplier. In its usual form, the single stage device employs a photocathode, emitting electrons in response to impinging radiation, a secondary emissive electrode or dynode, and a collector electrode or anode. In a multistage electron multiplier, a cascade of dynodes are employed, with successively higher biasing potentials, such that impinging primary electrons cause emission of secondary electrons in a multiplying progression from successive dynodes, and are ultimately collected by the anode which in turn provides an output signal.

It is desirable to utilize an electron multiplier for providing high resolution, high speed sampling of optical radiation; however, conventional photocathodic detecting structures do not possess adequate resolution nor speed to enable rapid sampling of optical signals, particularly in the measuring or detecting of a rapidly varying light level. Such light levels, which may be laser generated, may require sampling rates approaching the picosecond range. Additionally, the use of high sampling rates is best controlled electronically, at the actual sampling point. This latter feature is difficult to achieve in conventionally gridded photomultiplier structures.

It is therefore the primary object of the present invention to provide a sampling device which is operable with high resolution over a short sampling time.

It is another object of the present invention to provide a sampling device adapted to be employed with a conventional electron multiplier for improving the resolution thereof.

It is a further object of the present invention to provide a sampling device which may be electronically controlled to produce sampling intervals of shorter duration than heretofore possible while maintaining high resolving characteristics.

The foregoing objects are realized in a device constructed of a housing having a path for impinging radiation and a photoemissive element positioned across said path. A photoelectron ejection electrode is positioned adjacent the photoemissive element and a sampling potential difference can be applied across the element and electrode. Any electrons emitted by the element due to the incident radiation thereon during the sampling pulse duration is accelerated through the ejection electrode to a suitable detection device such as a conventional electron multiplier. The device structure includes an elongated photoemissive strip located in close proximity to the ejection electrode, the latter taking the form of a circular wire mesh. The width of the strip and its distance from the mesh are set with predetermined relationship for optimum, high-speed results.

The foregoing objects and brief description of the present invention will become more apparent from the following detailed description and appended drawings wherein FIG. 1 shows the head of the present invention utilized with an electron multiplier;

Figure 1:
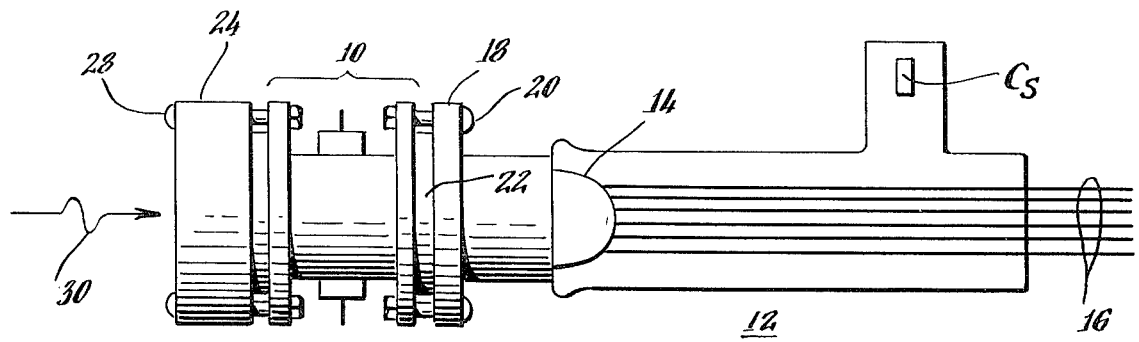

Referring to FIG. 1, sampling head 10 constructed in accordance with the present invention is shown in mounted position on a conventional electron multiplier 12. For purposes of illustration, the electron multiplier may be that of an RCA Model 7102 photo-tube including a dynode/anode structure 14 including a plurality of voltage leads 16 for applying a potential to the dynode/anode electrode structure 14. Other conventional electron multipliers may also be employed with the sampling head. The photo-tube 12 has been modified to the extent that an external source of electrons, supplied by the sampling head 10, may be provided. To this end, a flange 18 including mounting bolts 20 provides a support frame for mounting the head 10 to the tube 12. An O-ring seal 22 may be provided to vacuum and optically seal the head outlet to the tube inlet.

On the left side of the head 10, referring to FIG. 1, a lens or window unit 24 is bolted to the optical inlet side of the head 10. A further O-ring seal 26 may be used to vacuum seal the optical element through the head. The head is bolted by means of bolts 28 to the lens structure 24.

Incident radiation 30 impinges, through the lens 24, upon the photosensitive surface creating photoelectrons which are sampled by the head 10 in a manner to be set forth in further detail below, and the resulting electron flow multiplied in the electrode structure 14 of the electron multiplier 12.

Figure 2:
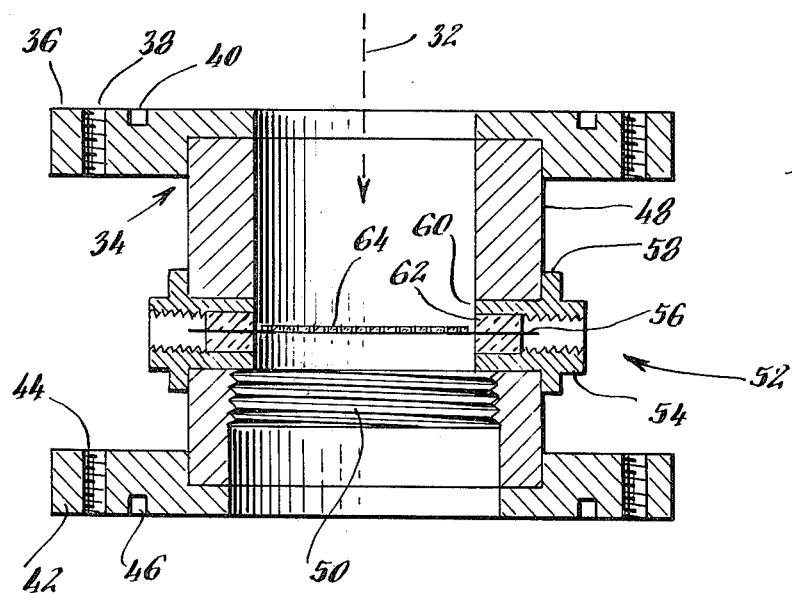
FIG. 2 is a cross section along the optical path of the head showing the housing and photoemissive strip.

The structure of the sampling head 10 is shown in greater detail in FIGS. 2–5. The cross section FIG. 2 shows that the sampling head includes a central optical path 32 passing through a housing indicated generally as 34. The upper flange 36 of the head structure 34 includes bolt holes 38 for accommodating the bolts 28, and a groove 40 for accommodating the O-ring 26, shown in FIG. 1. The lower flange 42 of the head structure 34 includes bolt holes 44 for accommodating the bolts 20, and a groove 46 for accommodating the O-ring 22.

The housing 34 further includes a side wall 48 which may be square or circular in shape. The internal passage way 32, axially defining the optical path, is preferably round in shape and includes a plurality of threads 50 formed in the interior wall for accommodating an insert, shown in FIG. 3. The housing 34, including flanges and side walls, as preferably constructed of a cold rolled steel or like sturdy conductive material.

Incorporated into the side walls 48 are a pair of feedthrough leads 52 which include a conductive cap 54

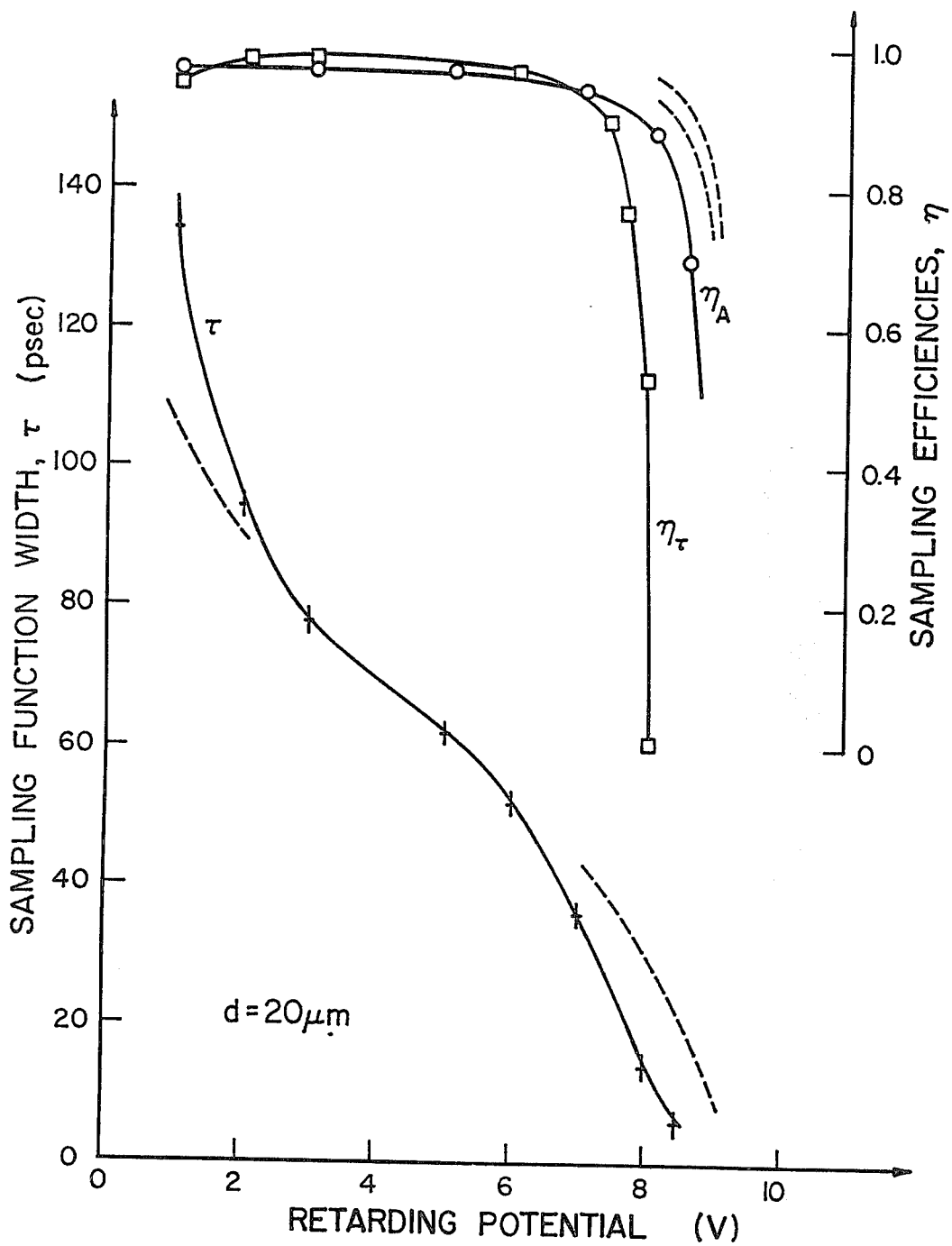
Figure 7. Sampling function width, τ, and sampling efficiencies $\eta_\tau$ and $\eta_A$ as a function of retarding potential for sampling pulses of 10 V peak, 100 psec basewidth; light at $\lambda = 6200 \overset{\circ}{A}$; cesium-antimonide photocathode.

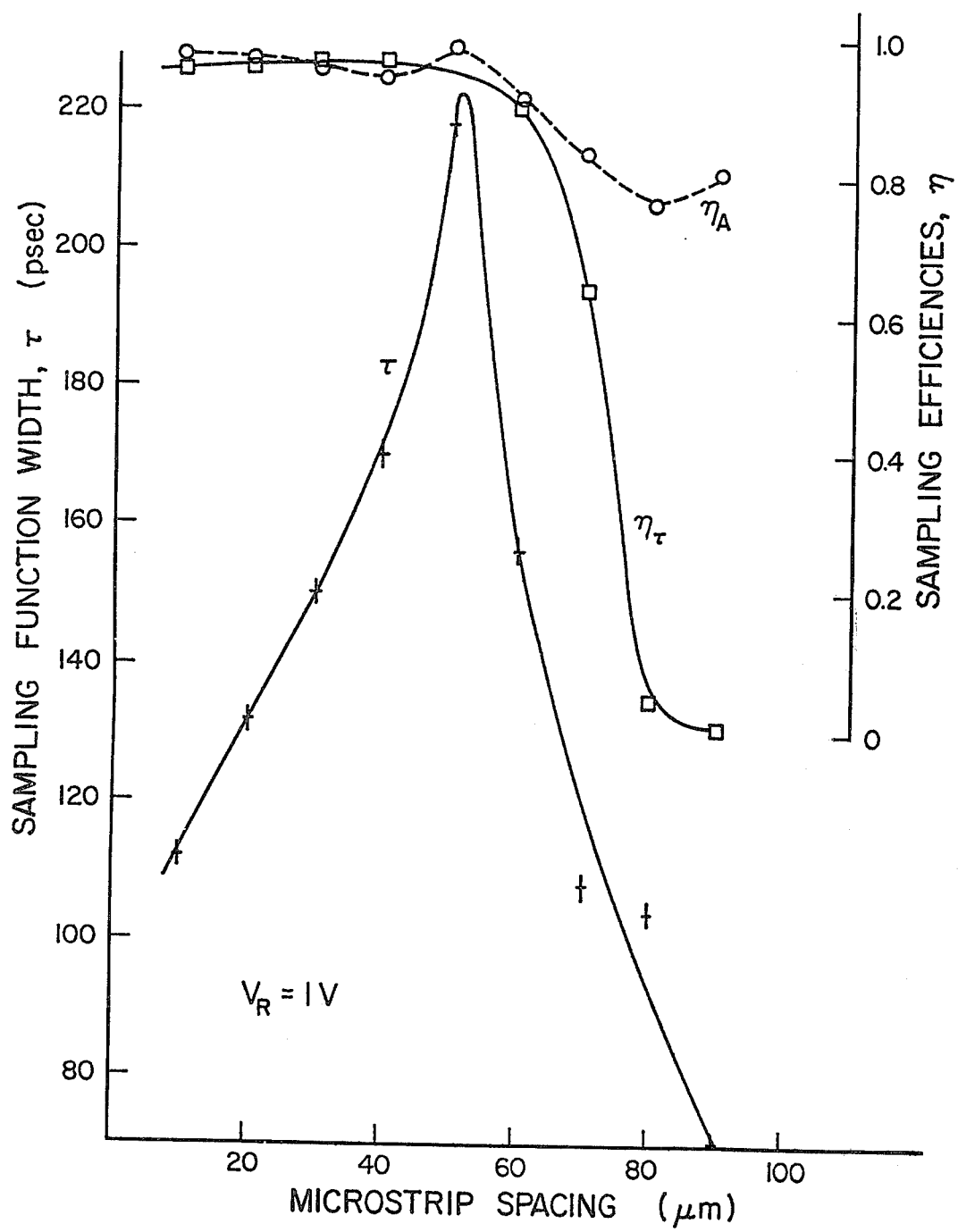
Figure 8. Sampling function width, $\tau$, and sampling efficiencies $\eta_\tau$ and $\eta_A$ as a function of microstrip spacing for sampling pulses of 10 V peak, 100 psec basewidth.

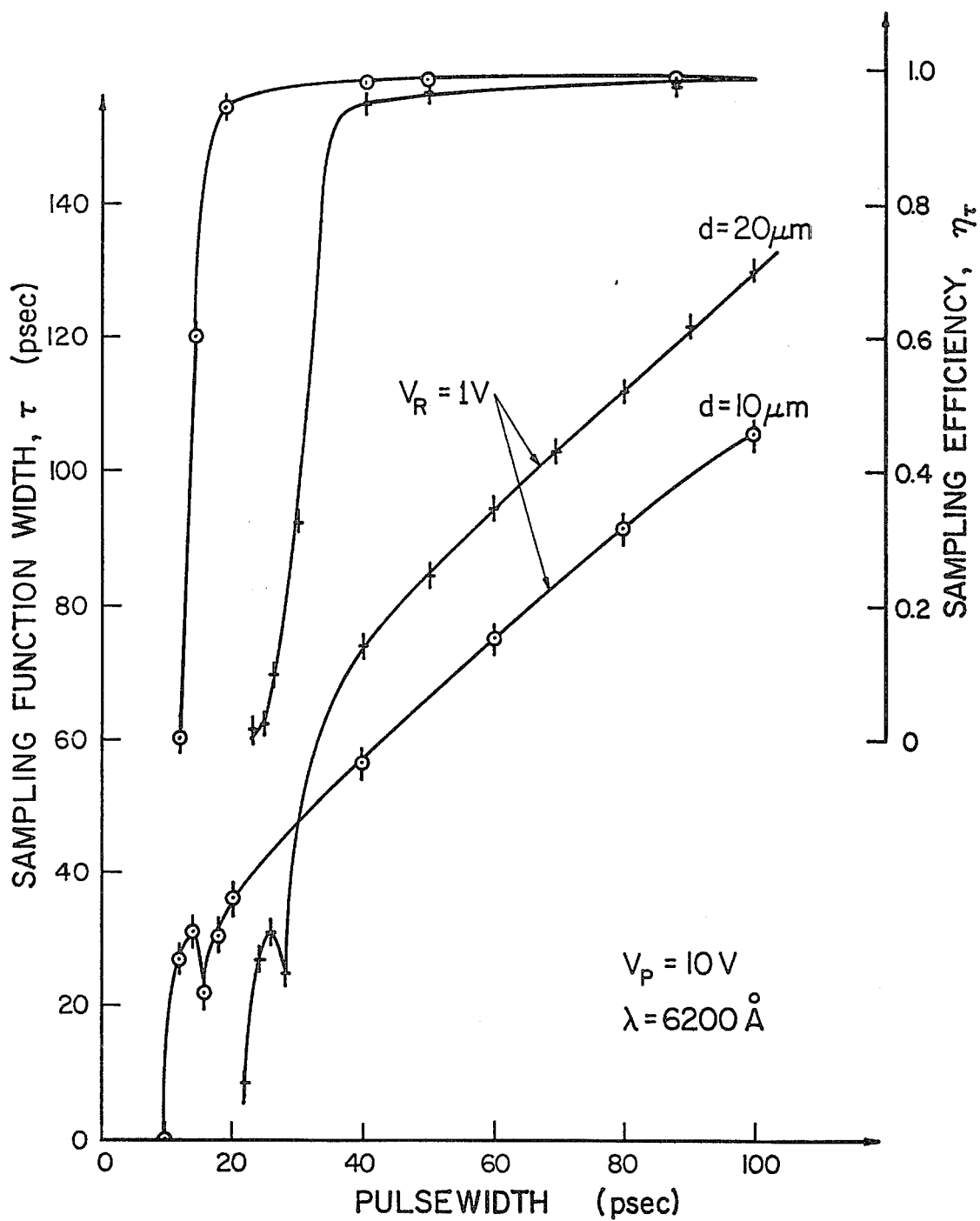
Figure 9. Sampling function width, $\tau$, and sampling efficiencies $\eta_\tau$ and $\eta_A$ as a function of sampling pulsewidth for sampling pulses of 10 V peak; light at $\lambda = 6200$ Å; cesium-antimonide photocathode.

OPTOELECTRONIC SAMPLING HEAD

The invention herein described was made under a contract with the Department of the Navy.

This invention relates to optical detection devices and specifically to optical sampling heads usable in conjunction with photoelectron amplifying devices suitable for low power radiation detection.

A need exists for a high resolution sampling detector for detecting radiation levels, particularly optical, at relatively high sampling speeds. Since in many applications the photon flux level at high sampling speed will be low, a sensitive device for detection is required.

A conventional form of detection device is the photomultiplier. In its usual form, the single stage device employs a photocathode, emitting electrons in response to impinging radiation, a secondary emissive electrode or dynode, and a collector electrode or anode. In a multistage electron multiplier, a cascade of dynodes are employed, with successively higher biasing potentials, such that impinging primary electrons cause emission of secondary electrons in a multiplying progression from successive dynodes, and are ultimately collected by the anode which in turn provides an output signal.

It is desirable to utilize an electron multiplier for providing high resolution, high speed sampling of optical radiation; however, conventional photocathodic detecting structures do not possess adequate resolution nor speed to enable rapid sampling of optical signals, particularly in the measuring or detecting of a rapidly varying light level. Such light levels, which may be laser generated, may require sampling rates approaching the picosecond range. Additionally, the use of high sampling rates is best controlled electronically, at the actual sampling point. This latter feature is difficult to achieve in conventionally gridded photomultiplier structures.

It is therefore the primary object of the present invention to provide a sampling device which is operable with high resolution over a short sampling time.

It is another object of the present invention to provide a sampling device adapted to be employed with a conventional electron multiplier for improving the resolution thereof.

It is a further object of the present invention to provide a sampling device which may be electronically controlled to produce sampling intervals of shorter duration than heretofore possible while maintaining high resolving characteristics.

The foregoing objects are realized in a device constructed of a housing having a path for impinging radiation and a photoemissive element positioned across said path. A photoelectron ejection electrode is positioned adjacent the photoemissive element and a sampling potential difference can be applied across the element and electrode. Any electrons emitted by the element due to the incident radiation thereon during the sampling pulse duration is accelerated through the ejection electrode to a suitable detection device such as a conventional electron multiplier. The device structure includes an elongated photoemissive strip located in close proximity to the ejection electrode, the latter taking the form of a circular wire mesh. The width of the strip and its distance from the mesh are set with predetermined relationship for optimum, high-speed results.

Figure 3:
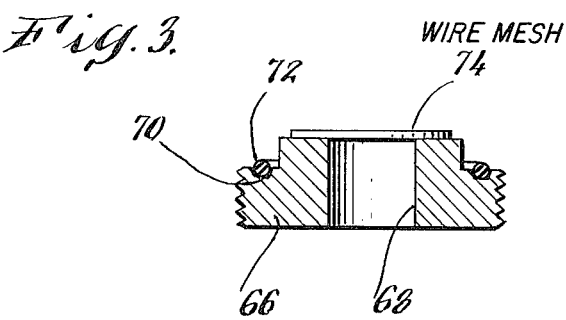
FIG. 3 illustrates the insert and ground plane element.
Figure 4:
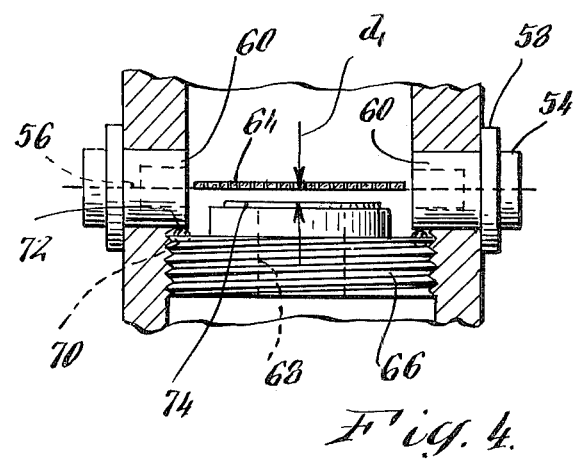
FIG. 4 shows the insert in position in the housing.
Figure 5:
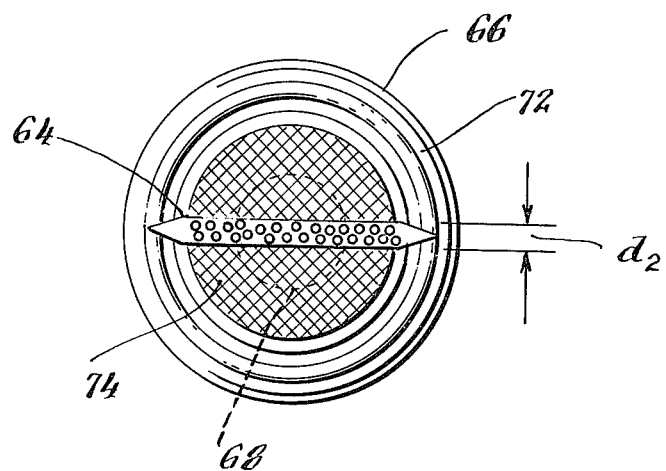
FIG. 5 is a top view showing the relationship of the strip to the underlying ground plane forming a microstrip configuration.

The foregoing objects and brief description of the present invention will become more apparent from the following detailed description and appended drawings wherein FIG. 1 shows the head of the present invention utilized with an electron multiplier;

FIG. 2 is a cross section along the optical path of the head showing the housing and photoemissive strip;

FIG. 3 illustrates the insert and ground plane element;

FIG. 4 shows the insert in position in the housing;

FIG. 5 is a top view showing the relationship of the strip to the underlying ground plane forming a microstrip configuration.

Figure 6:
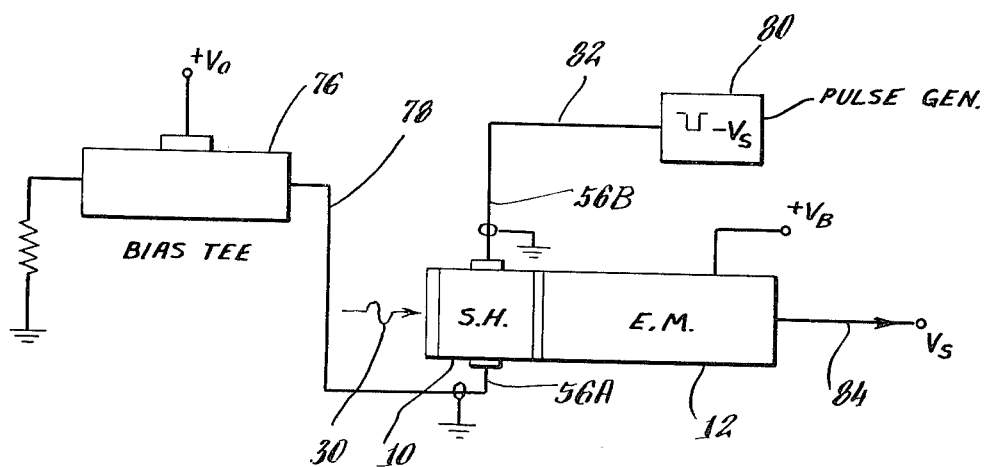
FIG. 6 is an illustration of the circuit utilizing the head of the present invention; and, FIGS. 7, 8 and 9 illustrate as examples the graphical relationships of the effect various dimensional parameters and biasing have on resolution and efficiency.

FIG. 6 is an illustration of the circuit utilizing the head of the present invention; and, FIGS. 7, 8 and 9 illustrate as examples the graphical relationships of the effect various dimensional parameters and biasing have on resolution and efficiency.

Referring to FIG. 1, sampling head 10 constructed in accordance with the present invention is shown in mounted position on a conventional electron multiplier 12. For purposes of illustration, the electron multiplier may be that of an RCA Model 7102 photo-tube including a dynode/anode structure 14 including a plurality of voltage leads 16 for applying a potential to the dynode/anode electrode structure 14. Other conventional electron multipliers may also be employed with the sampling head. The photo-tube 12 has been modified to the extent that an external source of electrons, supplied by the sampling head 10, may be provided. To this end, a flange 18 including mounting bolts 20 provides a support frame for mounting the head 10 to the tube 12. An O-ring seal 22 may be provided to vacuum and optically seal the head outlet to the tube inlet.

On the left side of the head 10, referring to FIG. 1, a lens or window unit 24 is bolted to the optical inlet side of the head 10. A further O-ring seal 26 may be used to vacuum seal the optical element through the head. The head is bolted by means of bolts 28 to the lens structure 24.

Incident radiation 30 impinges, through the lens 24, upon the photosensitive surface creating photoelectrons which are sampled by the head 10 in a manner to be set forth in further detail below, and the resulting electron flow multiplied in the electrode structure 14 of the electron multiplier 12.

The structure of the sampling head 10 is shown in greater detail in FIGS. 2–5. The cross section FIG. 2 shows that the sampling head includes a central optical path 32 passing through a housing indicated generally as 34. The upper flange 36 of the head structure 34 includes bolt holes 38 for accommodating the bolts 28, and a groove 40 for accommodating the O-ring 26, shown in FIG. 1. The lower flange 42 of the head structure 34 includes bolt holes 44 for accommodating the bolts 20, and a groove 46 for accommodating the O-ring 22.

The housing 34 further includes a side wall 48 which may be square or circular in shape. The internal passage way 32, axially defining the optical path, is preferably round in shape and includes a plurality of threads 50 formed in the interior wall for accommodating an insert, shown in FIG. 3. The housing 34, including flanges and side walls, as preferably constructed of a cold rolled steel or like sturdy conductive material.

Incorporated into the side walls 48 are a pair of feed-through leads 52 which include a conductive cap 54 having provision for attaching or incorporating a conductive wire 56. The cap 54 is supported on the housing by a support flange 58. The feedthrough is formed as a plug fitting into the wall 48, and includes an outer conductive shell 60 and an inner glass feedthrough member 62. Through the feedthrough is connected a conductive photoemissive strip 64, composed of a suitable photoemissive material such as cesium antimony or the like. The strip may be finely perforated or semi-transparent, or formed as a mesh, and has tapered ends. The component material structure of the feedthrough is designed to permit the coupling of the broadbound high frequency sampling signals to the strip 64.

The strip 64 is positioned across the optical path 32.

The insert 66, FIG. 3, is a conductive, externally threaded, round plug-like component including a central electron path 68 and a groove 70 for accommodating a spacer 72. The upper part of the insert 66 includes a fine wire mesh 74 which can be circular and which is affixed to the insert 66 as by spot welding or the like. The wire mesh 74 performs the function of a photoelectron ejection electrode in cooperation with the photoemissive strip 64, and requires a certain spacing with respect to the strip 64 for electronic matching in a microstrip configuration. The insert 66 is positioned into the body of the structure 34 by rotating the mating threaded portions of the insert 66 and the interior 50 of the housing 34 until the spacer 72 contacts the lower projecting portion of the shell 60, shown in FIG. 4. Accurate control of the spacer dimension will control the spacing distance $d_1$ between the strip 64 and the microstrip ground plane which acts as an ejection electrode 74. The electrode 74 is termed an ejection electrode in that it performs the function of causing electrons from the strip 64 to be ejected into the path 32.

The top of the assembly, viewed in the direction of the optical path 32, is shown in FIG. 5. The strip 64 is designed to have a predetermined width, $d_2$, across the optical path, which also provides maximum operational characteristics.

By way of example, the wire mesh may be constructed of a woven or etched nickel screen. Other conductive metallic materials compatible with phototube processing may also be employed.

Due to the high frequency of operation, the components forming the housing, insert, strip and feedthrough are, as shown in FIGS. 2–5, designed to be assembled employing techniques which will result in a broadband, nondispersive electrical system suitable for high vacuum construction. The relationship of the dimensions $d_1$ and $d_2$ are critical with respect to the device operation. These parameters are mutually interdependent in determining the mode propagation in accordance with broadband design criteria, and should be scaled to produce a reflectionless and dispersionless fundamental mode propagation. An example of such dimension selection will be found in the IRE Transactions of the Professional Group on Microwave Theory and Technique entitled, "Symposium on Microwave Strip Circuits", March, 1955.

According to the embodiment disclosed herein, where, as illustrated in FIGS. 7–9, resolution of optical pulse durations in the picosecond ($10^{-12}$ seconds) range can be achieved. The spacing $d_1$ was chosen at 300 microns to which corresponds a strip width, $d_2$, of 1.5 millimeters, all designed in accordance with microstrip design criteria and matched for a 50 ohm termination. The optical path 68, by way of reference, is about 1.5 inches in diameter.

The electron multiplier, which serves as the integrating-amplifier section, along with the output circuitry, is mounted in a large glass to metal seal. This is then brazed to an O-ring flange to allow the sampler portion to be bolted to the multiplier section. Before the two sections are joined together, antimony is deposited on the silver coated stainless steel strip by a vacuum-evaporation process. The strip is soldered to the center pins of the feedthrough connectors, and the sampling portion is bolted to the integrating amplifier section. Next, cesium gas is introduced into the previously evacuated system while the tube is baked in an oven at 150° C to form a cesium antimonide photocathode ($Cs_3Sb$).

Operation of the sampling head is set forth in FIG. 6. The head, 10, in position on the electron multiplier 12, is biased by applying a retarding potential $V_O$ to the strip 64. This potential $V_O$ is applied through a conventional bias tee 76, available from the General Radio Corp., for keeping the d.c. level free of sampling pulses. The potential $V_O$ is supplied to the electrode 64 by contacting lead 78 to feedthrough lead 56A, thereby rendering the potential of the electrode 74 negative with respect to the strip 64. An optical signal 30 is directed to the sampling head, as described above. A sampling pulse is supplied by the sampling pulse generator 80 along the line 82 through the feedthrough lead 56B to the strip 64. The sampling pulse $-Vs$, applied to strip 64, is negative with respect to the ground electrode 74 and serves to both cancel and exceed in magnitude the retarding potential $V_O$. Should radiation be incident upon the strip during the sampling pulse interval, electrons emitted from the strip 64 in response to incident photons will be accelerated by the potential difference toward the photoelectron ejecting element (the ground plane wire mesh 74) and pass through the electron path 68 into the electron multiplier 12. Since the electron multiplier, under the bias $+V_B$, serves to amplify the electron flow, an output signal Vs will be provided along line 84.

By way of example, and with the spatial dimensioning set forth above, the sampling head was employed with an optical pulse of about 300 psec rise time derived from a mode-locked HeNe laser. Using a −7 volt, 250 psec wide sampling pulse, with Vo set at −2.2 volts, full time resolution of the mode locked laser pulses were achieved.

Referring to FIGS. 7, 8 and 9 graphical relationships showing the criticality of the dimensional relationships, as well as the effect of varying potential levels, and sampling pulse widthes are demonstrated.

The parameters found useful in characterizing the optoelectronic sampler are the sampling efficiencies $\eta_\tau$, $\eta_A$ and the pulse width $\tau$. Thus, $\eta_\tau$ represents the ratio of the relative number of photoelectrons of the derived sampling function to the maximum possible number, $A_o\tau$, of photoelectrons that could be sampled in the same interval for the same set of conditions, and $\eta_A$ represents the ratio of the sampled photoelectrons of the sampling function to the total number of sampled photoelectrons in the entire sampling function. Clearly, $\eta_\tau$ and $\eta_A$ are maximally unity and are specified to designate amplitude sampling efficiency and sampling quality respectively.

As a result of this analysis, changes in $\eta_\tau$, $\eta_A$ and $\tau$ due to variations in the input conditions can be used to optimize the output signal with respect to resolution and signal magnitude.

The retarding potential represents the constant voltage applied to the sampler structure which prevents photoelectrons from reaching the sampler anode at all times that the sampling voltage pulse is not present. When the sampling voltage pulse does occur with sufficient amplitude, the net voltage difference between the photocathode and anode can result in photoelectrons traversing the sampler drift space. As the retarding potential is increased, the effective time during which the photocathode is forward biased decreases, resulting in improved resolution, as shown in FIG. 7.

Although improved resolution is desirable, one must consider the effect of increased retarding potential on sampling efficiencies. $\eta_T$ and $\eta_A$ tend to fall when the retarding potential is increased to a potential for which the effective duration of the sampling pulse is too short to allow those photoelectrons with comparatively small initial velocities to reach the anode.

FIG. 8 illustrates the effects of different spacings, $d_1$, between the photocathode and the sampler anode for a fixed set of parameters. From these numerical results, it can be shown that if the duration of the accelerating field is approximately equal to or smaller than the time necessary for all the emitted photoelectrons to traverse the drift space, then only those photoelectrons, if any, with large initial energies will be sampled. This results in a decrease in time dispersion due to the initial velocity spread of the photoelectrons as is illustrated in FIG. 8 for $d_1$ greater than 70 microns. Also note that the sampling efficiency $\eta_T$ rapidly deteriorates as fewer photoelectrons are collected.

FIG. 9 illustrates the dependence of the sampling function width and the sampling efficiency on the incident wavelength for a cesium antimonide photocathode. It should be noted that, in all cases considered, wherever the sampling efficiencies dropped, the order $\eta_A > \eta_T$ was preserved, indicating that though signal magnitudes could become small, signal fidelity would be retained. For the exemplary cesium antimony photocathode considered, it appears that the highest resolution and greatest sampling efficiencies occur in the red part of the visible spectrum. Those incident wavelengths which result in the narrowest range of energies for the emitted photoelectrons will be capable of the highest resolution since the transit time dispersion effect which degrades the time response to a sampling photomultiplier tube is due to the spread of initial velocities of the emitted photoelectrons.

Although the invention has been described in conjunction with certain preferred embodiments, it will be understood that other variations, modifications, substitutions, additions and deletions may be made within the framework and spirit of the invention.

What is claimed is:

1. A high speed sampling head for photoelectrons comprising a housing having a path for impinging radiation, a strip-shaped photoemissive element positioned across said path, planar photoelectron ejection means positioned in proximity to said photo-emissive element in said path, means for propagating a high speed sampling potential difference between said photoemissive element and said photoelectron ejection means, means for accelerating photoelectrons emitted by said photoemissive element in response to said incident radiation, and means for detecting said photoelectrons, whereby said ejection means constitute a microstrip ground plane for said photoemissive element.

2. The head of claim 1 wherein said photoelectron ejection means is a circular wire mesh.

3. The head of claim 1 wherein said photoemissive element is an elongated shaped strip across said optical path having a predetermined narrow dimension width relative to the spacing from said photoelectron ejection means.

4. The head of claim 3 wherein said photoemissive element is perforated.

5. The head of claim 1 wherein said means for detecting is an electron multiplier.

6. The head of claim 1 wherein a first bias potential is applied to said photoelectron ejection means whereby said photoelectron ejection means becomes negative with respect to said photoemissive element and wherein said sampling potential has a magnitude greater than said first bias potential, thereby rendering said photoelectron ejection means momentarily positive with respect to said photoemissive element.

7. An optoelectronic sampling head comprising a housing having an optical path for impinging light, a photoemissive elongated strip positioned across said optical path and supported in said housing by broadband insulated electrical feedthrough elements, an insert positionable in said housing, said insert including a photoelectron ejection ground plane and an electron path, and spacer means mounted to said insert and positioned with said insert against said housing for positioning said photoelectron ejection ground plane with predetermined spatial distance from said photoemissive strip.

8. The head of claim 7 wherein said photoelectron ejection ground plane is a circular wire mesh.

9. The head of claim 8 wherein said photoemissive element is perforated or semitransparent.

10. The optoelectronic sampling head of claim 7 further including means for applying a high frequency content sampling potential difference along said broadband feedthrough elements relative to said ground plane for accelerating photoelectrons emitted by said photoemissive strip toward said ground plane and along said electron path, and means coupled to said housing for receiving and detecting electrons passing along said electron path.

11. The head of claim 10 wherein said photoelectron ejection ground plane is a metallic mesh.

12. The head of claim 10 wherein said photoemissive element is perforated or semitransparent.

13. The head of claim 10 wherein said means coupled to said housing is an electron multiplier.

14. The head of claim 10 wherein a first electron retarding potential is applied to said photoelectron ejection ground plane and wherein said sampling potential exceeds said first retarding bias potential and is negative with respect to the potential of said photoelectron ejection ground plane.

15. The sampling head of claim 7, wherein said photoelectron ejection ground plane is spaced from said strip a distance up to 300 microns.

16. An optoelectronic sampling head comprising a conductive housing defining an optical path in the axial direction of said housing for impinging light, a pair of diametrically opposite apertures in said housing, insulation means sealed in said apertures, electrical leads extending through said insulating means, an elongated photoemissive strip supported on said leads inside said housing, a conductive insert positioned within said housing and having affixed thereto a perforated photo-electron ejection ground plane normal to the axis of said housing, said ground plane being spaced from said elongated strip a distance up to 300 microns in the axial direction of said housing, and electron multiplier means affixed to said housing in the optical path on the end thereof toward said ground plane, whereby said ground plane constitutes a microstrip ground plane for said strip.

17. The sampling head of claim 16 wherein said housing is provided with internal threads, said insert having external threads engaging said internal threads whereby the axial position of said ground plane is adjustable, whereby said ground plane is electrically connected to said housing, and further comprising a source of a sampling potential connected to said leads, and a source of a bias potential connected to said leads.

* * * * *